United States Patent [19]
King

[11] 3,868,073
[45] Feb. 25, 1975

[54] PROPULSION SYSTEM FOR AIRCRAFT

[76] Inventor: Myron L. King, c/o Lyzon Art Galleries, 411 Thompson Ln., Nashville, Tenn. 37211

[22] Filed: Jan. 30, 1974

[21] Appl. No.: 438,025

[52] U.S. Cl............................................. 244/34 A
[51] Int. Cl. ............................................... B64c 3/10
[58] Field of Search........ 244/65, 34 A, 34 R, 12 R, 244/12 CW, 13, 15

[56] References Cited
UNITED STATES PATENTS

| | | | |
|---|---|---|---|
| 1,365,339 | 1/1921 | Olhovsky | 244/65 X |
| 1,956,054 | 4/1934 | Wagner | 244/12 CW |
| 2,118,052 | 5/1938 | Odor | 244/34 A UX |
| 2,510,959 | 6/1950 | Custer | 244/12 CW |

FOREIGN PATENTS OR APPLICATIONS
1,091,843  4/1955  France.............................. 244/34 A

*Primary Examiner*—Trygve M. Blix
*Assistant Examiner*—Paul E. Sauberer
*Attorney, Agent, or Firm*—Harrington A. Lackey

[57] ABSTRACT

An aircraft having pairs of upper and lower air foils projecting from opposite sides of the fuselage, with upper and lower arcuate portions defining a pair of air ducts. A propeller is rotatably mounted behind each air duct so that the path of the propeller tips is above the respective trailing edges of the upper arcuate air foils. The upper arcuate air foils merge to form a trough which air is pulled by the propeller tips rotating toward each other.

9 Claims, 5 Drawing Figures

PATENTED FEB 25 1975 3,868,073

PROPULSION SYSTEM FOR AIRCRAFT

BACKGROUND OF THE INVENTION

This invention relates to aircraft, and more particularly to a propulsion system for aircraft.

Various types of VTOL aircraft and aircraft adapted for short take-offs have been developed, as represented in U.S. Pat. Nos. 2,918,230 of Lippisch; 2,929,580 of Ciolkosz; 2,974,899 of Fowler; and 3,350,035 of Schlieben. The aircraft in these patents employ louvers, or means for turning the propellers relative to the fuselage, in order to direct the propelled air in different directions, including down, to assist in the vertical or short take-off.

SUMMARY OF THE INVENTION

It is an object of this invention to provide an aircraft, preferably a small aircraft, whose propulsion system is designed for a high degree of lift, but a relatively slow speed, in order to effect short take-offs.

The propulsion system made in accordance with this invention is a combination of particularly shaped air foils and propellers especially arranged relative to the air foils.

The air foils are arcuate portions of biplane wing members having opposed concave surfaces to form air ducts on opposite sides of the fuselage. The upper air foils preferably converge into each other, and also preferably into the top surface of the fuselage to form a "Venturi" trough. Rotatably mounted behind each air duct is a propeller in which the rotary path of the propeller tips is above the trailing edges of the upper arcuate air foils, including the trailing edge of the trough, and also is approximately level with or above the trailing edges of the lower air foils.

The propellers are driven in opposite directions so that they move toward each other as they pass the trailing edges of the upper air foils. This movement of the propellers above the trailing edges of the upper air foils creates vacuum not only over the top surfaces of the upper air foils, but also in the trough, to substantially augment the lift of the aircraft. Negative pressure is also formed over the top surfaces of the lower air foils to provide additional lift. The propellers also, of course, provide the necessary thrust for moving the aircraft forward.

DESCRIPTION OF THE PREFERRED EMBODIMENT

Figure 2:
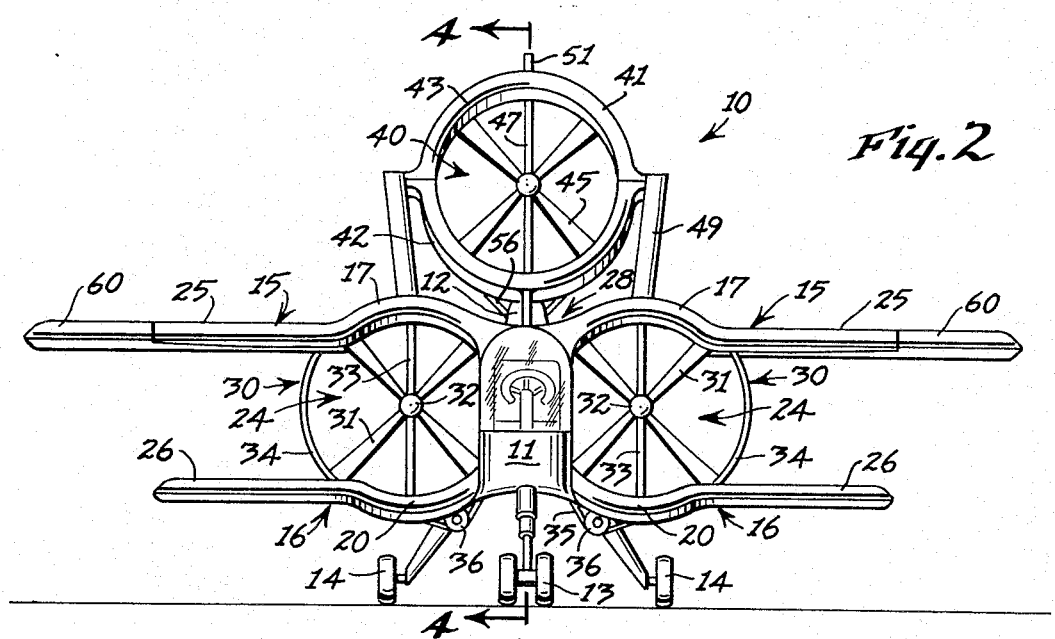
FIG. 2 is a front elevation of the aircraft.
Figure 1:
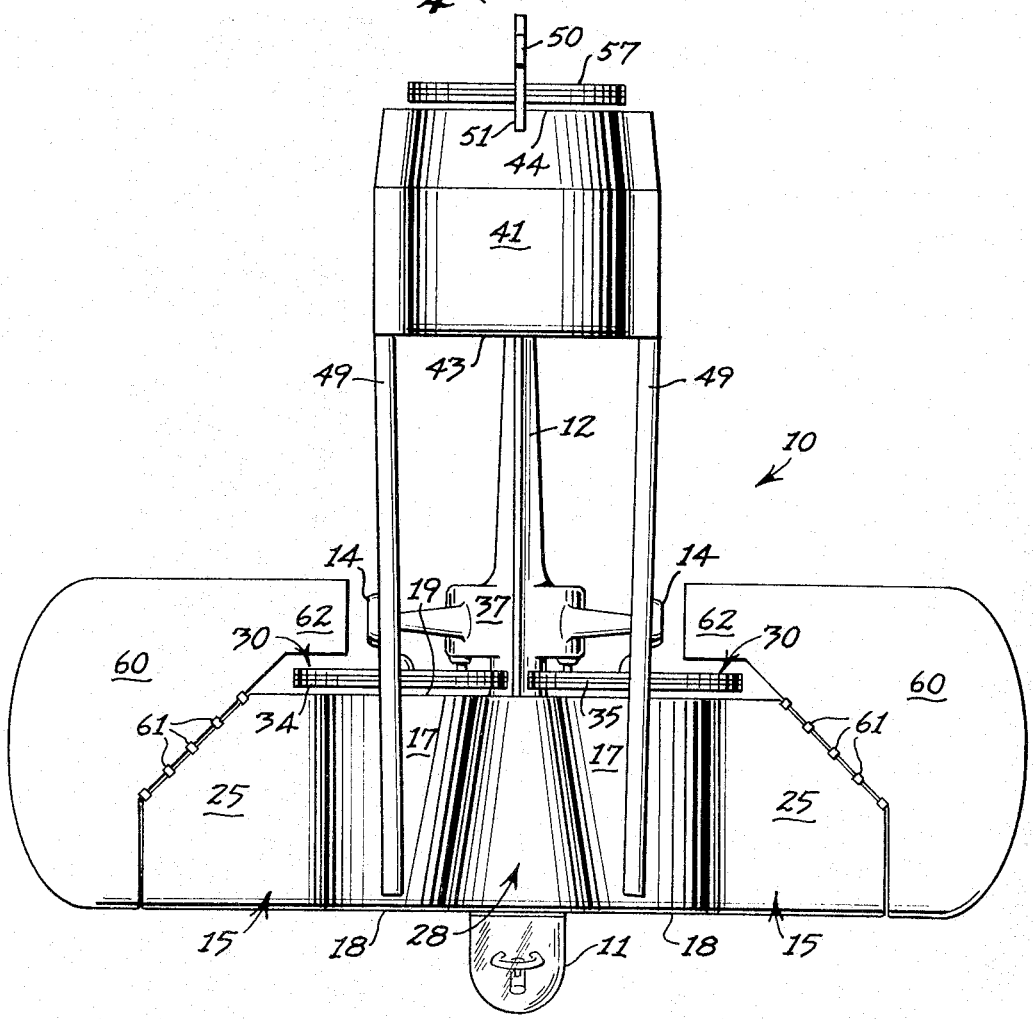
FIG. 1 is a top plan view of the aircraft embodying this invention.

Referring now to the drawings in more detail, the aircraft 10 made in accordance with this invention includes a fuselage including a cabin 11 and an elongated tail boom 12 supported upon the ground by landing gear 13 and 14.

The aircraft 10 is essentially a biplane having upper wing members 15 projecting laterally outward from both sides of the top of the cabin 11, and lower wing members 16 projecting laterally from the fuselage 11 beneath the upper wing members 15.

The inner portion of each wing member 15 is an arcuate-shaped air foil 17 extending transversely convex upward and having a leading edge 18 and a trailing edge 19.

In a similar manner, the inner portions of each lower wing member 16 is in the form of arcuate air foil 20 extending transversely convex downward, and having a leading edge 21 and a trailing edge 22. The lower air foils 20 are vertically below the upper air foils 17 so that the opposing concave surfaces of the respective air foils 17 and 20 generally define a pair of passages or ducts 24.

The outer portions of the wing members 15 are substantially planar wing sections 25, while the outer projecting portions of the lower wing members 16 are also substantially planar wing sections 26 substantially parallel to the upper wing sections 25.

Figure 4:
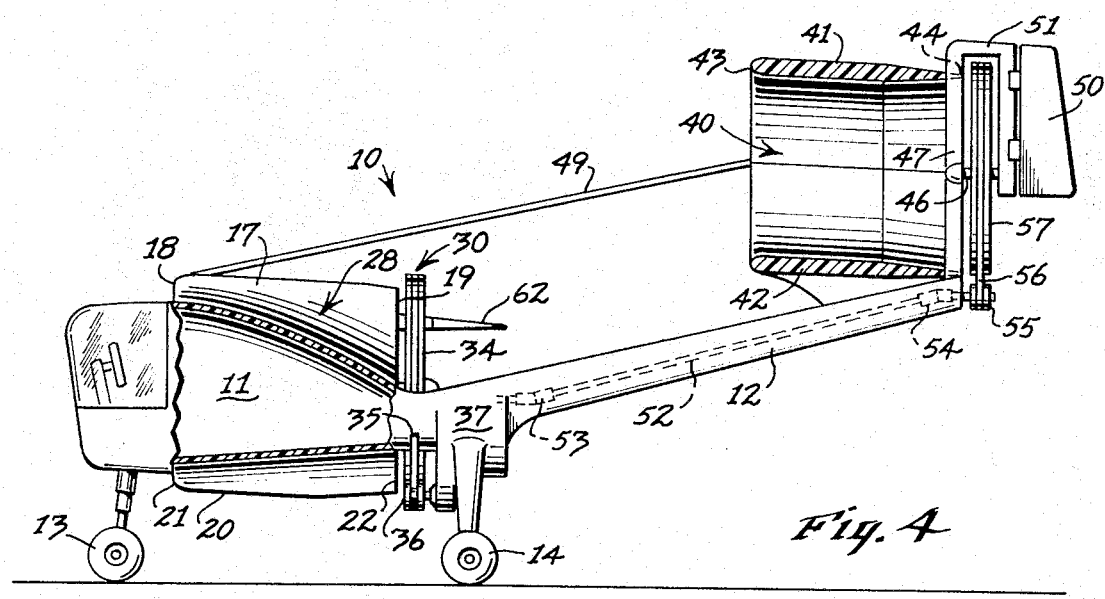
FIG. 4 is a view similar to FIG. 3, with a portion of the fuselage shown in section along the line 4—4 of FIG. 2.
Figure 3:
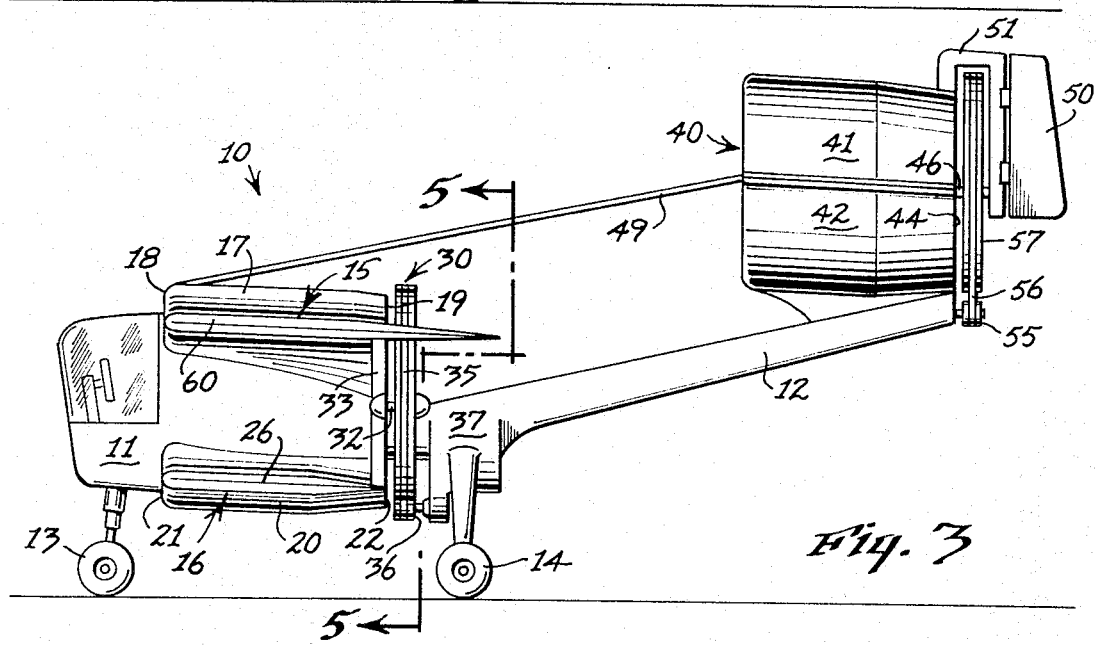
FIG. 3 is a left side elevation of the aircraft.

The upper air foils 17 converge not only with each other, but with the top of the fuselage or cabin 11, to form an elongated trough 28. As best disclosed in FIG. 4, the trough 28 declines in a streamlined surface rearward.

A propeller 30 is journalled for rotation behind each air duct 24. Each propeller 30 includes propeller blades 31 fixed on shaft 32 journalled for rotation in appropriate bearings in the bearing struts 33 fixed between the air foils 17 and 20. The propeller blade tips are connected by a peripheral drive ring 34 having outer circumferential grooves for receiving a drive belt 35. The drive belt 35 is driven by drive pulleys 36 counter-rotated by appropriate drive means, such as an internal combustion engine and transmission, within the drive housing 37 forming a part of the fuselage.

Figure 5:
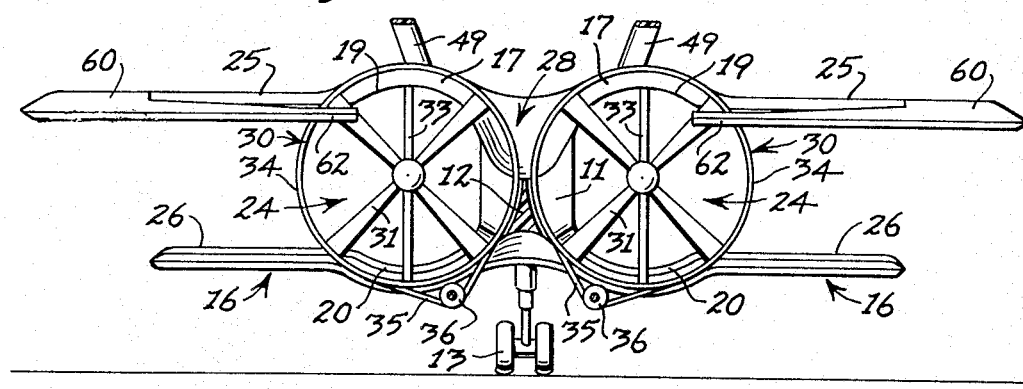
FIG. 5 is a section taken along the line 5—5 of FIG. 3.

The tips of the propeller blades travel in a circular path which is above the trailing edges 19 of the upper air foils 17 and approximately the same level as the trailing edges 22 of the lower air foils 20, as best illustrated in FIG. 5. It will also be observed in FIG. 5 that the rotary path of the blade tips also overlaps or is above the trailing edge of the trough 28. The rotary path of the tips of the propeller blades 31 is, of course, indicated in the drawings by the rotary movement of the driven ring 34.

The drive pulleys 35 are driven in opposite directions so that the movement of the blade tips across the trailing edges 19 of the upper air foils 17 are toward each other, and therefore toward the trough 28. This movement of the tips of the blades 31 above the trailing edges 19 draws air rearward over the tops of the upper air foils 17, thereby producing a net negative pressure above the upper air foils 17 to create lift. Furthermore, the movement of the propeller blades 31 toward each other across the trailing edge of the trough 28 draws air inward and rearward through the valley created by the trough 28 to create substantial negative pressure above the trough 28 to provide a cumulative lift effect upon the aircraft 10.

It is important that the rotary path of the tips of the blades 31 not be below the trailing edges 22 of the lower air foils 20 so that a net negative pressure will not be created by the propellers 30 below the lower air foils 20. To the contrary, the movement of the propeller blades 31 will create a net negative pressure above the lower air foils 20 to provide lift for the lower wing members 16. Thus, the shape of the air foils 17 and 20, the converging air foils forming the trough 28, and the rotational directions of the propellers 30, create cumulative lift over various areas of both wing members 15 and 16.

Fixed to the rear end of the tail boom 12 is a tail duct 40, of substantially circular configuration, having an upper arcuate air foil segment 41 and a lower arcuate air foil segment 42, both of which have leading edges 43 and trailing edges 44. In the configuration of the tail duct 40, both air foil segments 41 and 42 are jointed along their sides to form a closed tubular duct. A tail propeller 45 of identical construction to the front propellers 30 is fixed on the shaft 46 for rotation in a bearing in the bearing struts 47 fixed on the tail duct 40.

The rotary path of the blades in the propeller 45 is also above the trailing edge 44 of the upper air foil segment 41 and substantially level with the trailing edge 44 of the lower air foil segment 42. The propeller 45 thus creates negative pressure over the top of the upper air foil segment 41 and over the top surface of the lower air foil segment 42, to effect lift in the tail duct 40. The tail duct 40 may be additionally supported by elongated side struts 49 fixed to the upper surfaces of the upper air foils 17.

Although the guidance mechanism for the aircraft 10 is not a part of this invention, nevertheless a rudder 50 may be rotatably mounted within bearings in a rudder support 51 fixed to the top of the air foil segment 41, and controlled by controls not shown, if desired.

The tail propeller 45 may be driven in the same manner as the front propellers 30, and from the same engine in the drive housing 37, through drive shaft 52, universal joints 53 and 54, drive pulley 55 and driven belt 56 around the drive ring 57 of the tail propeller 45.

When the tail duct 40 and tail propeller 45 are employed, it is important for most efficient operation that the tail duct 40 be mounted above and out of the slipstreams of the front propellers 30.

The outer ends of the upper wing sections 25 are preferably joined to ailerons 60 by hinges 61 for movement, by controls not shown in the cabin 11, either up or down about the axes of the hinges 61. Thus, the ailerons 60 may be used for controlling the ascent and descent of the aircraft 10, and might also be used for guidance to the right or left.

Preferably, the ailerons 60 are provided with inwardly projecting baffle portions 62, which not only project toward each other, but also project behind both corresponding front propellers 30, so the baffle portions may be used for diverting the slipstream from the propellers 30 in different vertical directions, that is either up or down or horizontally.

The wing members 15 and 16, as well as the tail duct 40 are preferably made of lightweight cellular material of certain minimum strength, such as solid polystyrene foam molded to the desired shapes and covered with "Dynel" fabric and epoxy resin, in accordance with a method well-known in the art. Such construction is not only extremely light, but also extremely strong.

It is therefore seen that the aircraft 10 is provided with propulsion means in the form of the air foils 17 and 20, the trough 28, the propellers 30, as well as the air duct 40 and tail propeller 45, for creating substantial cumulative lift, as well as forward propulsion for take-off and landing in areas of limited dimensions.

What is claimed is:

1. A propulsion system for aircraft comprising:
   a. a fuselage having a front-to-rear longitudinal axis,
   b. an upper air foil fixed to said fuselage and having a leading edge and a trailing edge,
   c. said upper air foil extending arcuately, convex upward, transversely of said fuselage,
   d. a lower air foil fixed to said fuselage, having a leading edge and a trailing edge, and spaced substantially vertically below said upper air foil,
   e. said lower air foil extending arcuately, convex downward, transversely of said fuselage, so that the opposed, spaced, concave surfaces of said air foils generally form an air duct,
   f. a rotary propeller having blade tips,
   g. means rotatably mounting said propeller behind said duct and adjacent the trailing edges of said air foils so that the rotary path of said propeller tips is above the trailing edge of said upper foil, but not below the trailing edge of said lower air foil, and
   h. means for driving said propeller.

2. The invention according to claim 1 in which the arcuate portions of the trailing edges of both said air foils form circular arcs, each of said arcs being concentric with the rotary axis of said propeller, and the arc of the trailing edge of the lower air foil having a radius substantially equal to the radius of said propeller tips.

3. The invention according to claim 1 in which said upper air foil comprises a right upper air foil projecting from the right side of said fuselage and a left upper air foil projecting from the left side of said fuselage, said lower air foil comprising a right lower air foil projecting from the right side of said fuselage and a left lower air foil projecting from the left side of said fuselage, said propeller comprising a right propeller and left propeller.

4. The invention according to claim 3 in which said right and left upper air foils converge to form a longitudinal trough concave upward, the rotary paths of said propeller tips being adjacent each other, and the means for driving said propellers being adapted to drive said propellers in opposite directions so that said right and left propeller tips move toward each other when moving along the trailing edges of said upper air foils.

5. The invention according to claim 4 in which said trough comprises a top surface portion of said fuselage.

6. The invention according to claim 4 in which said trough declines rearward.

7. The invention according to claim 3 in which the portions of all said air foils fixed adjacent said fuselage comprise the arcuate portions forming said left and right ducts, said air foils further comprising substantially planar wing members projecting transversely outward and rigid with said arcuate portions to form biplane wing members.

8. The invention according to claim 7 further comprising right and left planar aileron members, means hinging said right aileron member to the outer end of said upper right wing member, and means hinging said left aileron member to the outer end of said left upper wing member.

9. The invention according to claim 8 in which each of said aileron members comprises baffle portions projecting inward behind the corresponding propellers.

* * * * *